(12) United States Patent
Smith et al.

(10) Patent No.: US 12,055,033 B2
(45) Date of Patent: Aug. 6, 2024

(54) RADIALLY ADJUSTABLE OUTSERT FOR A DOWNHOLE SENSOR

(71) Applicant: HALLIBURTON ENERGY SERVICES, INC., Houston, TX (US)

(72) Inventors: Justin Cole Smith, Kingwood, TX (US); Jeffrey James Crawford, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 459 days.

(21) Appl. No.: 17/260,091

(22) PCT Filed: Sep. 24, 2018

(86) PCT No.: PCT/US2018/052437
§ 371 (c)(1),
(2) Date: Jan. 13, 2021

(87) PCT Pub. No.: WO2020/068033
PCT Pub. Date: Apr. 2, 2020

(65) Prior Publication Data
US 2021/0270125 A1 Sep. 2, 2021

(51) Int. Cl.
*E21B 47/01* (2012.01)
*E21B 47/08* (2012.01)
*G01V 11/00* (2006.01)

(52) U.S. Cl.
CPC .............. *E21B 47/01* (2013.01); *E21B 47/08* (2013.01); *G01V 11/005* (2013.01)

(58) Field of Classification Search
CPC ...... E21B 47/01; E21B 47/017; E21B 47/013; E21B 47/08; E21B 17/10; E21B 23/00
See application file for complete search history.

(56) References Cited

U.S. PATENT DOCUMENTS 9,598,956 B2 * 3/2017 Sherrill ................... E21B 49/10
2004/0251048 A1 * 12/2004 Kurkoski ................. E21B 47/01
175/41

(Continued)

FOREIGN PATENT DOCUMENTS

WO    WO 2014-168960    10/2014

OTHER PUBLICATIONS

Korean Intellectual Property Office, International Application PCT/US2018/052437, International Search Report and Written Opinion, Jun. 24, 2019, 14pages, Korea.

*Primary Examiner* — Caroline N Butcher
(74) *Attorney, Agent, or Firm* — DeLizio, Peacock, Lewin & Guerra, LLP

(57) ABSTRACT

A downhole tool and method of utilizing the downhole tool to make measurements in a wellbore formed in a formation and having different wellbore diameters. The downhole tool generally includes a tool body defined along a longitudinal central axis and having an internal passage extending longitudinally therethrough and an external pocket extending therealong; a sensor module having a sensor and being deployed within the external pocket; a spacer deployed in the external pocket, the spacer positioned between the sensor module and the tool body; and a clamp attached to the tool body, the clamp overlaying both the sensor module and the spacer to confine the sensor module within the external pocket. The spacer may have an inner concave surface engaging the sensor module and an outer convex surface seating in the external pocket.

11 Claims, 6 Drawing Sheets

(56) References Cited

U.S. PATENT DOCUMENTS

| | | | |
|---|---|---|---|
| 2006/0151213 A1 | 7/2006 | Michael et al. | |
| 2012/0061559 A1* | 3/2012 | Ortiz | G01V 5/04 |
| | | | 250/269.1 |
| 2014/0150547 A1* | 6/2014 | Chau | E21B 47/06 |
| | | | 73/152.51 |
| 2015/0337645 A1* | 11/2015 | Finke | E21B 17/026 |
| | | | 73/152.03 |

* cited by examiner

US 12,055,033 B2

RADIALLY ADJUSTABLE OUTSERT FOR A DOWNHOLE SENSOR

CROSS-REFERENCE TO RELATED APPLICATIONS

This application is a U.S. national stage patent application of International Patent Application No. PCT/US2018/052437, filed on Sep. 24, 2018, the benefit of which is claimed and the disclosure of which is hereby incorporated herein by reference in its entirety.

TECHNICAL FIELD

The present disclosure relates generally to sensors for use with oil and gas wellbore equipment, and, more particularly, to a radially adjustable outsert for a downhole sensor.

BACKGROUND

Sensor packages are commonly used with downhole tools in the oil and gas industry. Sensor data may be collected, for example, in measurement-while-drilling (MWD) applications to help guide or map the drilling process (particularly in directional drilling operations), and in logging-while-drilling (LWD) applications, to collect useful data about properties of the formation being drilled. Examples of sensors used in MWD/LWD applications include angular measurements, toolface, density, porosity, gamma ray, resistivity, acoustic, and/or imaging sensors, among others. Sensors may be used in any type of downhole tool along the drill string including in the bottomhole assembly (BHA). Some sensor packages may be placed on the outside of the tool body for ease of assembly and replacement, and to position the sensors within operational proximity to the formation to be sensed.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

DETAILED DESCRIPTION

Various embodiments of a radially adjustable outsert for downhole sensors are disclosed, including related systems and methods. The radially adjustable aspect of such an outsert provides a variable, user-selectable adjustment of the sensors with respect to a tool body, and thus to the formation being drilled. This variability allows the user (e.g., an oilfield services company) to achieve a desirable radial distance for a given formation or borehole size and profile, and to help plan or account for the otherwise variable proximity or standoff distance of the sensor arising from the varying borehole size. For example, an expected increase or decrease in the proximity or standoff distance of the formation due to borehole size may be accommodated by correspondingly positioning the radially adjustable outsert.

In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

Figure 1:
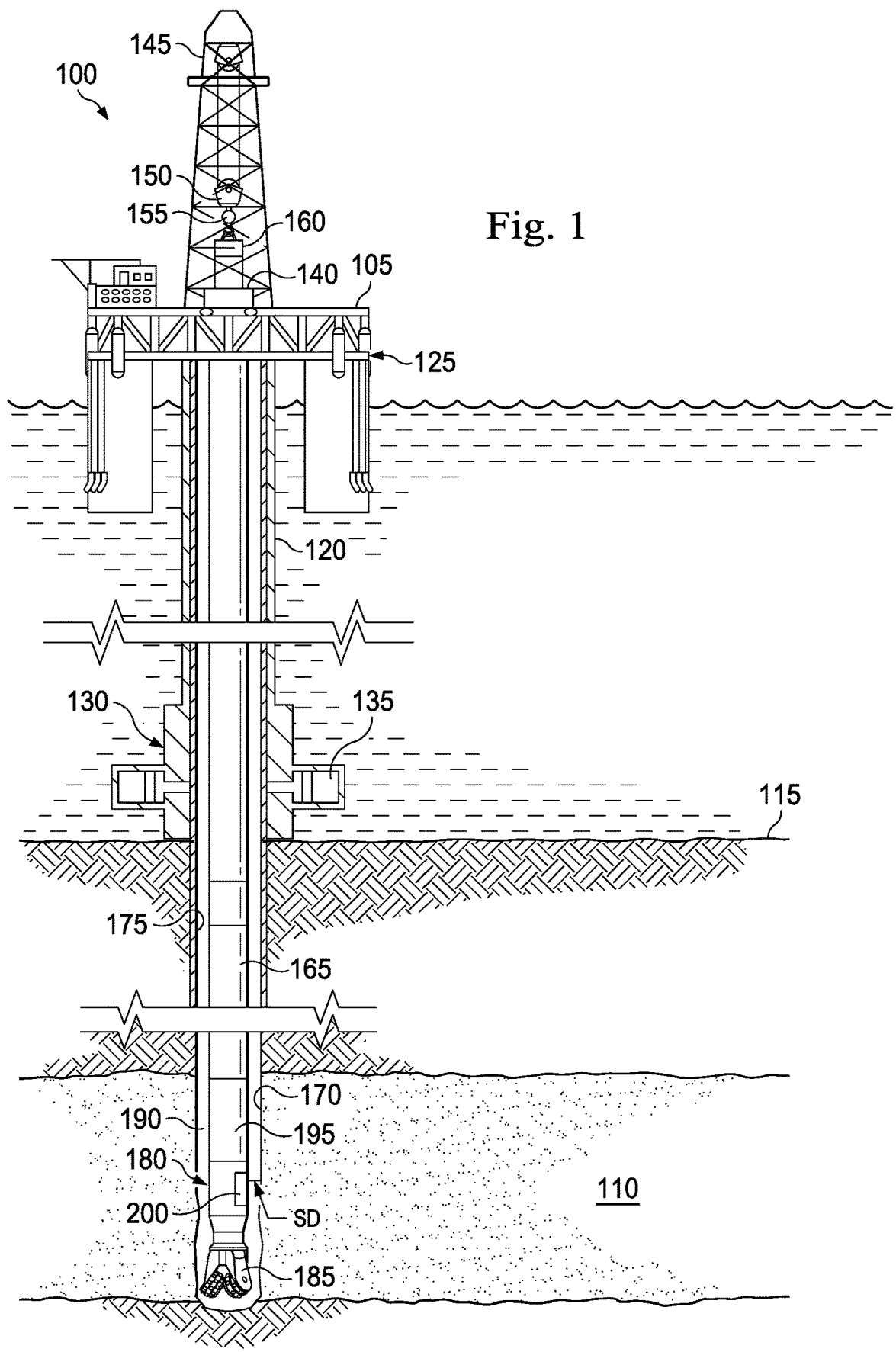
FIG. 1 is an elevational view of an offshore oil and gas platform operably coupled to a BHA on which a radially adjustable outsert may be used.

FIG. 1 is an elevational view of an offshore oil and gas platform 100 operably coupled to a BHA 180 on which one or more radially adjustable outserts may be employed. The offshore oil and gas platform 100 in this example includes a semi-submersible platform 105 that is positioned over a submerged oil and gas formation 110 located below a sea floor 115. A subsea conduit 120 extends from a deck 125 of the platform 105 to a subsea wellhead installation 130. One or more pressure control devices 135, such as, for example, blowout preventers (BOPs), and/or other equipment associated with drilling or producing a wellbore may be provided at the subsea wellhead installation 130 or elsewhere in the system. The platform 105 may include a hoisting apparatus 140, a derrick 145, a travel block 150, a hook 155, and a swivel 160, which components are together operable for raising and lowering a conveyance string 165.

The conveyance string 165 may include, for example, a casing string, a drill string, a completion string, a work string, a pipe joint, coiled tubing, production tubing, other types of pipe or tubing strings, and/or other types of conveyances, such as wireline, slickline, and the like. In the embodiment of FIG. 1, by way of example, the conveyance string 165 is an axially extending tubular string made up of a plurality of pipe joints coupled together end-to-end. The platform 105 may also include a kelly, a rotary table, a top drive unit, and/or other equipment associated with the rotation and/or translation of the conveyance string 165. A wellbore 170 extends from the subsea wellhead installation 130 and through the various earth strata, including the formation 110. At least a portion of the wellbore 170 may include a casing string 175 cemented therein. Connected to the conveyance string 165 and extending within the wellbore 170 is the BHA 180, which is generally tubular and may include a radially adjustable outsert 200 for a downhole sensor. As will be further discussed below, the outsert 200 allows for a variable, user-selectable standoff distance SD of the sensors from the formation 110.

The BHA 180 includes a drill bit 185 that may be rotated during drilling to cut the formation (e.g., by scraping, gouging, or shearing). Drilling mud is communicated from the surface of the well downward through the conveyance string 165 and out through the drill bit 185 into the wellbore 170 to carry cuttings to the surface, while lubricating the drill bit 185. The drilling mud carrying drill cuttings returns to the surface of the well through an annulus 190 defined exterior to the conveyance string 165. A radially adjustable outsert may alternatively or additionally be included elsewhere in the conveyance string 165; for example, the radially adjustable outsert 200 may be included as part of another downhole tool 195 incorporated into the conveyance string 165 above the BHA 180, as shown in FIG. 1.

Figure 2A:
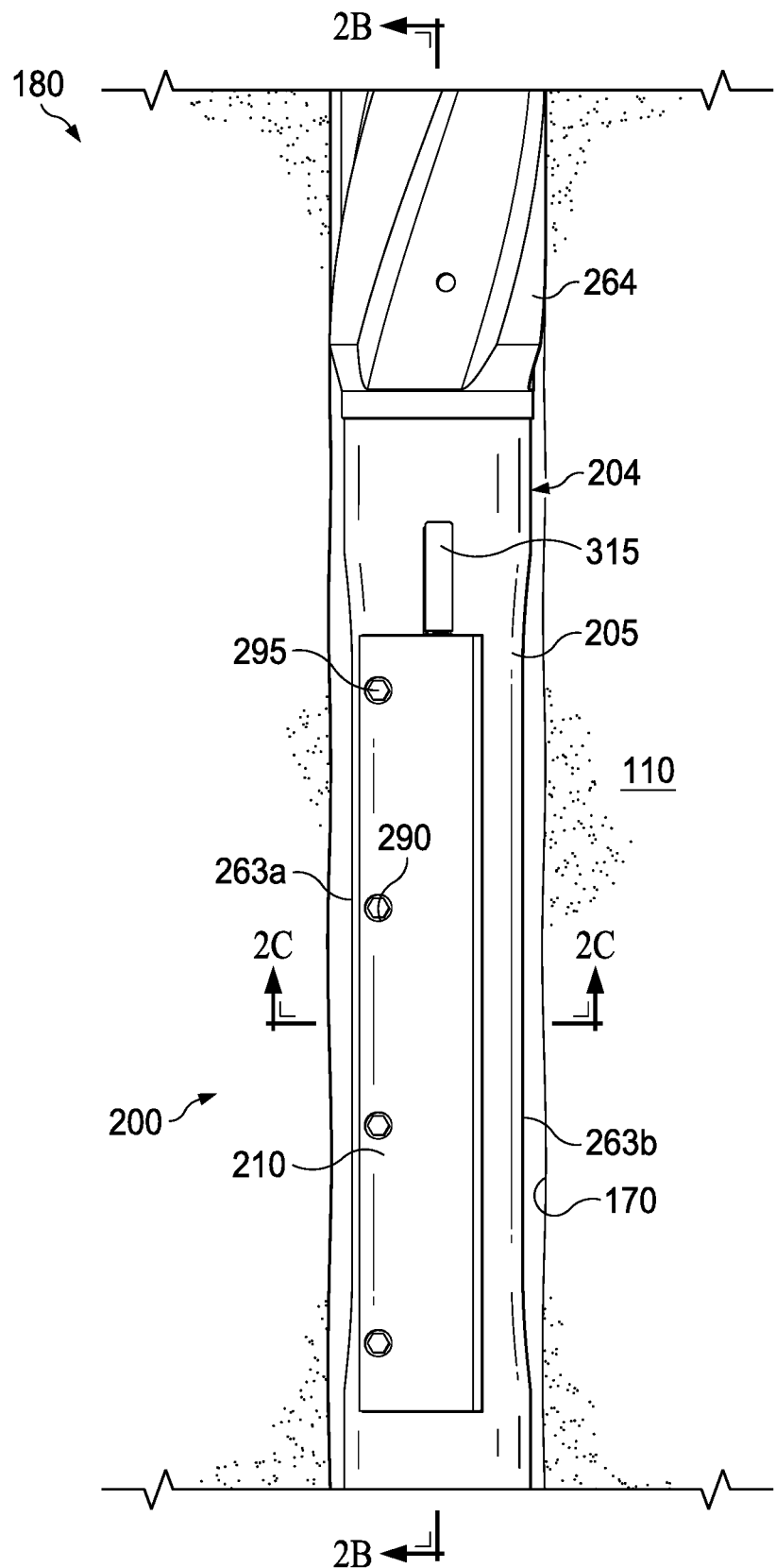
FIG. 2A is an enlarged view of the BHA of FIG. 1 further illustrating an example configuration of the radially adjustable outsert.

FIG. 2A is an enlarged view of a portion of the BHA 180 of FIG. 1 further illustrating an example configuration of the radially adjustable outsert 200 of FIG. 1. A downhole tool 204 carried on the BHA 180 includes a tool body 205 to which the outsert 200 and/or various other tool components may be assembled. The outsert 200 includes a sensor module (further discussed below) and a clamp 210 for securing the sensor module to the tool body 205. Any suitable clamp configuration may be used; in the example configuration shown, the clamp 210 may include a plurality of through holes 290 through which fasteners 295 may extend to secure the clamp 210 to the tool body 205. In some embodiments, as in FIG. 2A, the downhole tool 204 may be attached adjacent a centralizer 264 to assist with positioning of the radially adjustable outsert 200 with respect to the wellbore 170. In this example, a cover plate 315 is also positioned along the tool body 205 adjacent the clamp 210 to seal and protect various electrical components of the downhole tool 204 from wellbore fluids. Although the tool 204 is not limited to a particular type of tool, the tool body 205 includes one or more optional, external scoops 263*a* and 263*b*, to control the flow of drilling mud past the downhole tool 204. The scoops 263*a* and 263*b* are positioned on the tool body 205 to promote the flow of drilling mud along the scoops 263*a* and 263*b* and to minimize the flow of drilling mud adjacent the clamp 210.

Figure 2B:
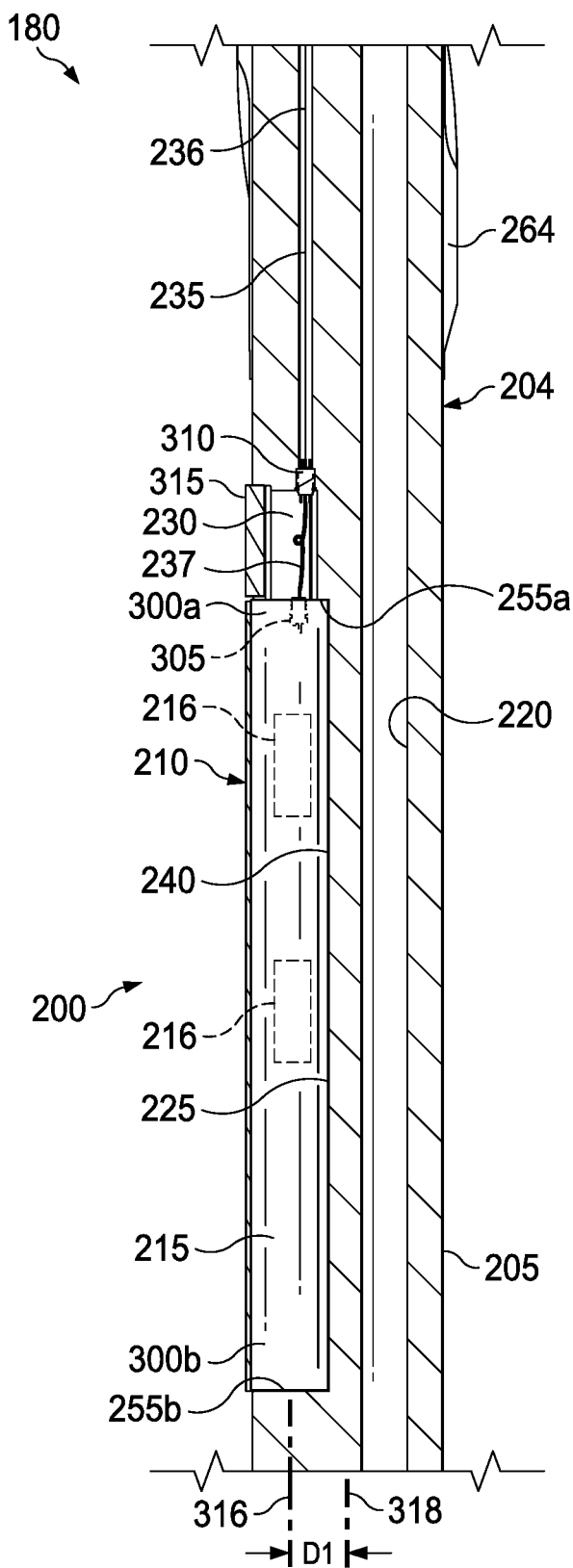
FIG. 2B is a cross-sectional view of the BHA and the radially adjustable outsert of FIG. 2A taken along the line 2B-2B of FIG. 2A.

FIG. 2B is a cross-sectional view of the BHA 180 and the radially adjustable outsert 200 of FIG. 2A taken along the line 2B-2B of FIG. 2A. The downhole tool 204 is optionally coupled with the centralizer 264 in this example. A sensor module 215 extending along a longitudinal central axis 316 is retained within an external pocket 225 by the clamp 210 which overlays the pocket 225 and the sensor module 215. The sensor module 215 is modular in that, for a given mechanical form factor, the sensor module 215 may be configured with any of a variety of sensors or sensor arrays desired. Thus, different sensor modules may each be configured with different sensors, such as for different applications or as redundant/backup sensor modules, and any one of the sensor modules, via the singular overall form factor, may be interchangeably positioned on the tool 204 as described herein. In any given sensor module, one or more downhole sensors 216 can be housed within the sensor module 215, such as, for example, gamma ray, resistivity, acoustic, and/or imaging sensors, among others.

The tool body 205 of the downhole tool 204 extends along a longitudinal central axis 318, and may include an internal passage 220 within the tool body 205, the external pocket 225 along an outer surface of the tool body 205, an adjustment slot 230, and a wireway 235 along which extends a wire 236. The internal passage 220 extends longitudinally through the tool body 205 and is configured to communicate the drilling mud therethrough when the drilling mud is communicated from the surface of the well downward through the conveyance string 165 and out through the drill bit 185 into the wellbore 170, as described above with reference to FIG. 1. The sensor module 215 is positioned along the downhole tool 204 and within the external pocket 225 so as to be spaced apart from the central axis 318 at a distance D1, which distance D1 can be altered to accommodate changes in wellbore dimensions, as will be described in further detail below.

The sensor module 215 in this example is a generally elongated tubular member defining opposing first and second end portions 300*a* and 300*b*, with a first electrical connector 305 adjacent the first end portion 300*a*. With the sensor module 215 retained within the external pocket 225 of the tool body 205 by the clamp 210 overlaying the pocket 225, the first connector 305 of the sensor module 215 is adjacent the adjustment slot 230 of the tool body 205 and the second electrical connector 310 is adjacent the second end portion 300*b* in or near the wireway 235. The adjustment slot 230 extends between the end portion 255*a* of the external pocket 225 and the wireway 235, and in so doing provides a path for a wire 237 to extend, connecting the first electrical connector 305 of the sensor module 215 to the second electrical connector 310 so as to establish electrical communication with the wire 236. The wireway 235 extends from the adjustment slot 230 longitudinally through the tool body 205 and receives the power and/or communication wire 236 therein. The first electrical connector 305 may provide a waterproof barrier between the pocket 225 and the adjustment slot 230, while the second electrical connector 310 may provide a waterproof barrier between the adjustment slot 230 and the wireway 235. In some embodiments, the cover plate 315 extends over the adjustment slot 230 to protect the wire 237 and the electrical connectors 305 and 310 from wellbore fluids.

Figure 2C:
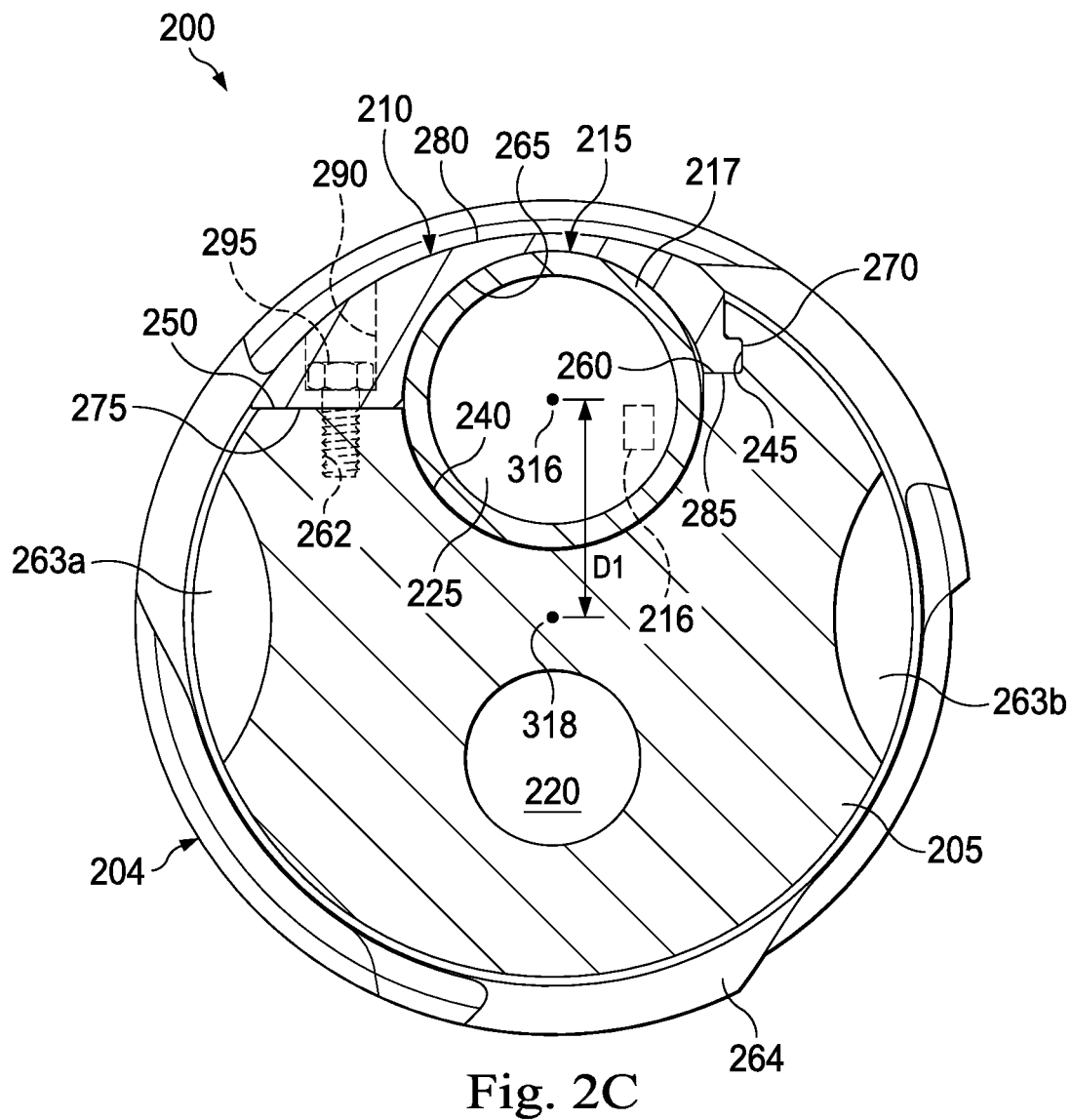
FIG. 2C is a cross-sectional view of the BHA and radially adjustable outsert of FIG. 2A taken along the line 2C-2C of FIG. 2A.

FIG. 2C is another cross-sectional view of the BHA 180 and radially adjustable outsert 200 of FIG. 2A, taken along the line 2C-2C of FIG. 2A. This view also shows the generally circular cross-sectional configuration of the generally tubular sensor module 215 and external pocket 225 in which the sensor module 215 is retained. The generally circular profile of the external pocket 225 may be cooperatively defined, as illustrated, by an arcuate interior portion 240 of the tool body 205 and an arcuate interior portion 265 of the clamp 210, which together encircle the tubular sensor module 215. The external pocket 225 extends longitudinally along the tool body 205 and may be co-extensive with the clamp 210. In some embodiments, as in FIG. 2C, the tool body 205 may further include a groove 245 extending along one elongated side of the external pocket 225 parallel with the longitudinal central axis 318 and an opposing clamp connector surface 250 extending along an opposite elongated side of the external pocket 225.

The sensor module 215 is generally illustrated having an enclosure 217 within which the one or more sensors 216 are carried. In some embodiments, the enclosure 217 is generally sealed to resist the pressure and fluids of the wellbore in which it is deployed. The groove 245 and the surface 250 are formed in the tool body 205 and extend adjacent and on opposing sides of the external pocket 225. The surface 250 may be planar and provides a structure to which the clamp 210 can attach to overlay the sensor module 215 within the external pocket 225. A plurality of threaded holes 262 may be provided in the surface 250 for receipt of fasteners 295 utilized to attach the clamp 210 to the tool body 205. While the fasteners 295 are illustrated as one embodiment, in other embodiments, the present disclosure is not limited in the type of mechanism used to fasten the clamp 210 to the tool body 205. In some embodiments, the groove 245 is at least partially defined by a planar surface 260 extending adjacent the external pocket 225 opposite the surface 250.

The tool body 205 may include the one or more external scoops 263a and 263b to direct the flow of drilling mud across the downhole tool 204 so as to minimize the impact of mud flow on data acquired using the sensor module 215. In some embodiments, the external scoops 263a and 263b reduce the amount (or stabilize the flow) of drilling mud flowing over the sensor module 215, thereby increasing the effectiveness of the downhole sensors housed within the sensor module 215. As stated above, in some embodiments, the centralizer 264 may be coupled with the tool body 205 near the adjustment slot 230 to maintain the tool body 205 centralized within the wellbore 170 (shown in FIG. 1). Alternatively, the centralizer 264 may be a fixed centralizer integrally formed with the tool body 205 such as, for example, a blade type centralizer.

The clamp 210 includes an external surface 280 and an arcuate interior portion 265 shaped to partially extend around or encase the sensor module 215. The clamp 210 may further include a tongue 270 (for engaging the groove 245) and an attachment surface 275. The tongue 270 and the attachment surface 275 extend longitudinally adjacent and on opposing sides of the arcuate interior portion 265. The surface 275 may be planar. In some embodiments, the tongue 270 is at least partially defined by a planar surface 285 extending from the arcuate interior portion 265 opposite the surface 275. A plurality of through holes 290 are formed through the clamp 210 at the surface 275; for example, the plurality of through holes 290 may be countersunk into the external surface 280. The tongue 270 of the clamp 210 is accommodated within the groove 245 of the tool body 205 and the clamp 210 is connected to the tool body 205 by a plurality of fasteners 295 extending through the plurality of through holes 290 in the clamp 210 and threadably engaging the plurality of threaded holes 262 in the tool body 205. While the tongue 270, the surface 275, the groove 245, the holes 290, and the fasteners 295 are described as one embodiment for attaching the clamp 210 to the tool body 205, in other embodiments, the present disclosure is not limited to a particular mechanism or arrangement for attaching the clamp 210 to the tool body 205. In the embodiment illustrated in FIG. 2C, the clamp 210 is shown as generally flush with the tool body 205.

As shown in FIGS. 2B and 2C, the clamp 210 overlays the sensor module 215 and the external pocket 225 so that the tool body 205 and the clamp 210, in combination, enclose the sensor module 215 and operate to maintain a distance D1 between the longitudinal central axis 316 of the sensor module 215 and the longitudinal central axis 318 of the tool body 205. The effectiveness of the downhole sensors (especially gamma ray sensors) housed within the sensor module 215 can be influenced by the proximity or standoff distance SD of the sensor module 215 from the formation 110, which proximity or standoff distance SD is determined by the size of the wellbore 170 and the magnitude of the distance D1.

Figure 3A:
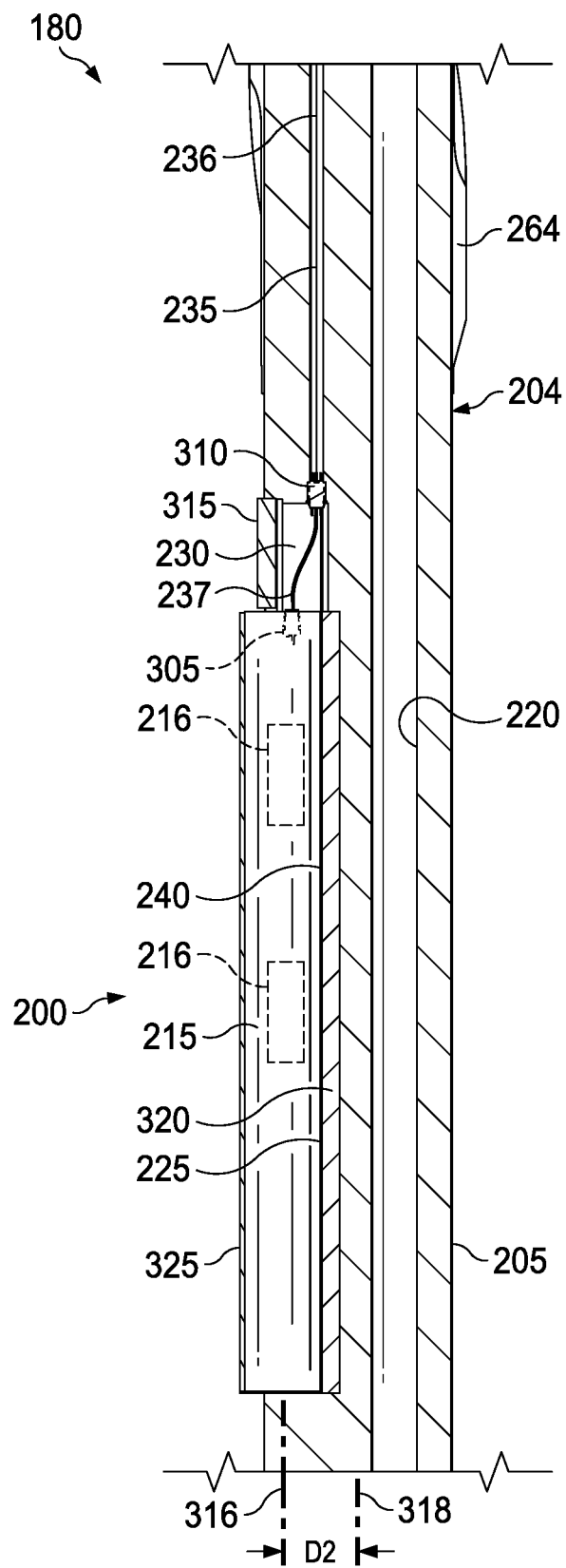
FIG. 3A is a cross-sectional view of another configuration of the radially adjustable outsert.

FIG. 3A illustrates the sensor module 215 extended radially outward from the central axis 318 of the tool body 205. FIG. 3A is similar to FIG. 2B, but the radial distance between the tool axis 318 and the sensor axis 316 has increased from the distance D1 to a distance D2 due to the presence of a spacer 320 inserted into the external pocket 225 between the sensor module 215 and the tool body 205. More specifically, as in FIG. 2B, the tool body 205 of the downhole tool 204 extends along the longitudinal central axis 318, and has the internal passage 220 within tool body 205, the external pocket 225 along the outer surface of tool body 205, the adjustment slot 230, and the wireway 235 along which extends the wire 236. The internal passage 220 extends longitudinally through the tool body 205. The sensor module 215 is positioned within the external pocket 225 so as to be spaced apart from the longitudinal central axis 318 at a distance D2, which distance D2 can be altered to accommodate changes in wellbore dimensions, as will be described in further detail below.

In the illustrated embodiment of FIG. 3A, the radially adjustable outsert 200 includes the spacer 320 and a clamp 325. The spacer 320 generally has a thickness T and is positioned between the tool body 205 and the sensor module 215, forcing the sensor module 215 radially outward by a distance equivalent to the thickness T of the spacer 320. In one or more embodiments, the spacer 320 may have a crescent-shaped cross-sectional area, with an inner concave surface disposed to engage the sensor module 215 and an opposing outer convex surface disposed to seat within external pocket 225. In some embodiments, spacer 320 is a single elongated structure disposed between sensor module 215 and tool body 205, while in other embodiments, the spacer 320 may be two or more shorter, spaced apart structures disposed between the sensor module 215 and the tool body 205. While the spacer 320 is generally depicted as crescent-shaped, the spacer 320 may have other shapes so long as the spacer 320 can be disposed between the sensor module 215 and the tool body 205 in order to radially alter the distance between the sensor module 215 and the longitudinal central axis 318 of the tool body 205. In this regard, the thickness T of the spacer 320 may be selected to achieve the desired radial placement of the sensor module 215 relative to the longitudinal central axis 318 of the tool body 205. The clamp 325 is sized to accommodate this radial shift. The spacer 320 may be in the form of a compressible biasing member (e.g., an elastomer or another spring-like material or structure) that urges the sensor module 215 radially outward toward the clamp 325.

The sensor module 215 is positioned within the external pocket 225 of the tool body 205 and is secured by the clamp 325 which overlays both the sensor module 215 and the spacer 320. The connector 305 of the sensor module 215 extends adjacent the adjustment slot 230 of the tool body 205. The adjustment slot 230 extends between the end portion 255a of the external pocket 225 and the wireway 235, and in so doing provides a path for the wire 237 to extend connecting the connector 305 of the sensor module 215 to the electrical connector 310 in or near the wireway 235 so as to establish electrical communication with the wire 236. In some embodiments, the cover plate 315 extends over the adjustment slot 230 to protect the wire 237 and the electrical connectors 305 and 310 from wellbore fluids.

Figure 3B:
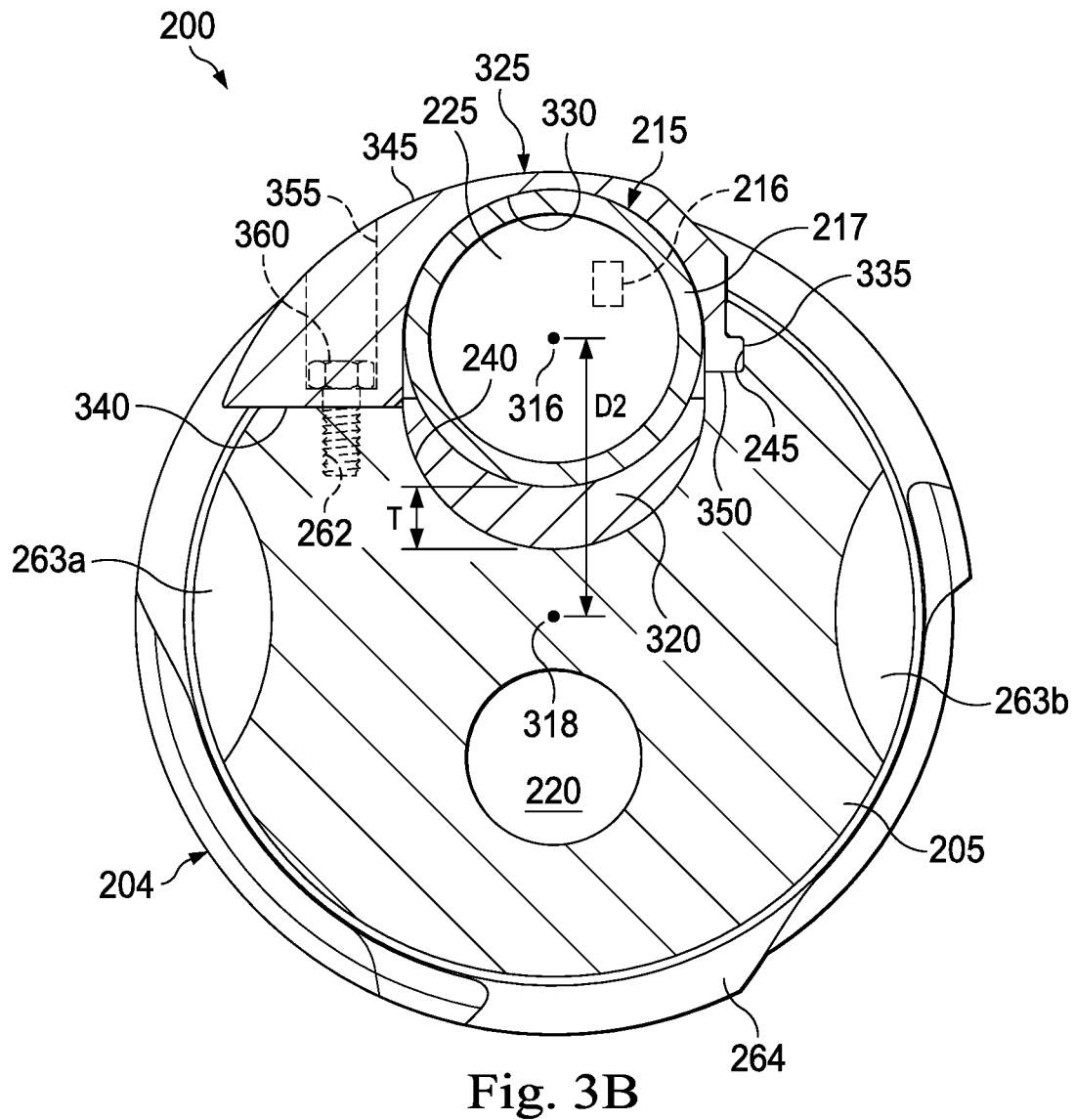
FIG. 3B is a cross-sectional view of yet another configuration of the radially adjustable outsert.

FIG. 3B is an axial cross-section of the downhole tool 204 shown in FIG. 3A. The clamp 325 includes an arcuate interior portion 330 and an external surface 345, and may further include a tongue 335 and a surface 340. The arcuate interior portion 330 is generally cylindrical to engage a portion of the sensor module 215.

The sensor module 215 is deployed within the external pocket 225. The sensor module 215 is generally illustrated as including an enclosure 217 with the one or more sensors 216 carried therein. The spacer 320 is also deployed within the external pocket 225, between the sensor module 215 and the tool body 205. The clamp 325 overlies both the sensor module 215 and the spacer 320, where the arcuate interior portion 330 of the clamp 325 is sized and shaped to accommodate the sensor module 215 radially adjusted by the spacer 320. In this regard, the clamp 325 may protrude radially from the tool body 205 (as opposed to generally being flush with the tool body 205 as illustrated in FIG. 2C).

While the disclosure is not limited to a particular mechanism for attachment of the clamp 325 to tool body 205, in certain embodiments, the clamp 325 may be attached to the tool body 205 utilizing the tongue 335 and the surface 340. The tongue 335 and the surface 340 extend adjacent and on opposing sides of the arcuate interior portion 330. Although not limited to a particular shape, the surface 340 may be planar and provides a structure to which the clamp 325 can attach. In some embodiments, the surface 340 extends from the arcuate interior portion 330. In some embodiments, the tongue 335 is at least partially defined by a planar surface 350 extending from the arcuate interior portion 330 opposite the surface 340. A plurality of through holes 355 are formed through the clamp 325 at the surface 340; for example, the plurality of through holes 355 may be countersunk into the external surface 345. The tongue 335 of the clamp 325 is accommodated within the groove 245 of the tool body 205 and the clamp 325 is connected to the tool body 205 by a plurality of fasteners 360 extending through the plurality of through holes 355 in the clamp 325 and threadably engaging the plurality of threaded holes 262 in the tool body 205. While the fasteners 360 are illustrated in one embodiment, the present disclosure is not limited in the type of mechanism utilized to fasten the clamp 325 to the tool body 205.

As shown in FIGS. 3A and 3B, the tool body 205, the spacer 320, and the clamp 325, in combination, function to maintain a distance D2 between the longitudinal central axis 316 of the sensor module 215 and the longitudinal central axis 318 of the tool body 205. The effectiveness of the downhole sensors (especially gamma ray sensors) housed within the sensor module 215 can be influenced by the proximity or standoff distance SD of the sensor module 215 from the formation 110, which proximity or standoff distance SD is determined by the size of the wellbore 170 and the magnitude of the distance D2. Because the spacer 320 extends between the tool body 205 and the sensor module 215, the distance D2 is greater than the distance D1, it being understood that spacers of varying thickness can be interchanged with one another in order to alter the distances D1 and D2 as desired.

For example, in some embodiments, the spacer 320 is replaced with another spacer in order to alter the distance D2. Likewise or in addition thereto, the clamp 325 is replaced with another clamp sized to accommodate the altered distance D2. For another example, in those embodiments in which the spacer 320 is a biasing member, the clamp 325 may simply be replaced with another clamp without changing the spacer 320 so that the spacer 320 urges the sensor module 215 radially outward toward the clamp at a distance other than the distance D2. As a result, the radially adjustable outsert 200 is configurable to accommodate changes in wellbore sizes, maintaining a consistent standoff distance SD across a range of wellbore sizes and thus, permitting the same sensor positioning, relative to the wellbore wall, for each sensor measurement.

Regardless of whether the longitudinal central axis 316 of the sensor module 215 is maintained at the distance D1, the distance D2, or some other distance from the longitudinal central axis 318 of the tool body 205, the adjustment slot 230 provides a path for electrically connecting the connector 305 of the sensor module 215 to the connector 310 in or near the wireway 235. In this regard, the wire 237 is a flexible power and/or communication wire within the adjustment slot 230 and connects the connector 305 of the sensor module 215 to the connector 310 in or near the wireway 235; this flexible wire 237, the electrical connectors 305 and 310, and the wire 236 accommodated within the wireway 235 provide a communication path to the surface of the well for the downhole sensors housed within the sensor module 215. In some embodiments, the flexible wire 237 within the adjustment slot 230 is of sufficient length or otherwise has sufficient slack to maintain the connection between the connector 305 of the sensor module 215 and the connector 310 in or near the wireway 235 when the distance between the longitudinal central axis 316 of the sensor module 215 and the longitudinal central axis 318 of the tool body 205 is adjusted (i.e., to the distance D1, the distance D2, or some other distance). As a result, the communication of data and/or power to/from the surface of the well is maintained even when the distance between the longitudinal central axis 316 of the sensor module 215 and the longitudinal central axis 318 of the tool body 205 is changed (e.g., when the sensor module 215 is spaced closer to the formation 110).

In some embodiments, the radially adjustable outsert 200 is adjustable through the use of spacers, such as the spacer 320, of varying size so that the sensor module 215 can be maintained at a consistent standoff distance from the formation 110 across a broad range of wellbore sizes. In some embodiments, the spacer 320 itself has a variable size to accommodate exchanging the clamp 210 (or another clamp) for the clamp 325 (or another different clamp). By maintaining consistent standoff distance regardless of wellbore size, the measurement quality of the downhole sensors is normalized and repeatable, since the sensor module 215 standoff can be adjusted to be the same anywhere along the wellbore, regardless of the wellbore dimensions. Likewise, because each measurement utilizing the sensor module 215 can be made at a consistent standoff distance, the radially adjustable outsert 200 aids in reducing measurement variability by the downhole sensors 216 housed within the sensor module 215 with changing wellbore diameter.

As described above, in some embodiments, rather than interchanging spacers of varying thickness to adjust the standoff of a sensor relative to the wellbore wall, the spacer 320 may be in the form of a compressible biasing member that urges the sensor module 215 radially outward toward the clamp 325. This biasing member may be an elastomer, spring or another spring-like material or structure. In any event, in conjunction with such biasing spacers 320, the clamp 325 may be interchangeable rather than the spacer. In some embodiments, the thickness of the clamp 325 between the arcuate interior portion 330 and the external surface 345 may change in order to adjust the positioning of sensor module 215. In addition thereto, or alternatively, the shape of arcuate interior portion 330 may change. Thus, for example, the arcuate interior portion 330 may be more rounded in shape at a first radius for a first clamp 325 and more oval in shape having a radially extending major oval length that is greater than the first radius for a second clamp 325, wherein the more oval shaped second clamp 325 will allow the sensor module 215 to shift radially outward under biasing from the spacer 320. Alternatively, the arcuate interior portion 330 may be more rounded in shape at a first radius for a first clamp 325 and more oval in shape having a radially extending minor oval length less than the first radius for a second clamp 325, wherein the more oval shaped second clamp 325 will allow the sensor module 215 to shift radially inward under biasing from spacer 320. In other words, in the first instance, arcuate interior portion 330 is deeper in shape for the second clamp 325, while in the second instance, arcuate interior portion 330 is shallower in shape for the second clamp 325 when compared to the shape of the arcuate interior portion 330 of the first clamp 325.

In operation, spacers and/or clamps may be interchanged as desired to allow the downhole tool to be utilized to make measurements in a wellbore formed in a formation and having different wellbore diameters. The sensor is inserted in an external pocket formed along an exterior surface of the tool and secured in the pocket with a clamp that overlays the sensor. The tool may be deployed within a wellbore segment having a first diameter. In so doing, a sensor is positioned within the wellbore. More specifically, the sensor is carrier in an outsert of the tool as described above, and the sensor is positioned adjacent the formation at a first standoff distance. The sensor may then be utilized to acquire a first set of data, such as the data described above. As will be appreciated, the tool may be centralized along a central axis of the wellbore for the data acquisition operation. Since the wellbore includes different wellbore diameters, a location within a segment of the wellbore having a second diameter different than the first diameter is identified for data acquisition activities. Based on the diameter of the wellbore at this identified location, a spacer is inserted in or removed from the external pocket to radially adjust the sensor position. Specifically, in some instances, a spacer is inserted into the external pocket of the tool between the tool body and the sensor to radially adjust the sensor outward from the tool axis. The clamp (or another clamp) is then reattached to overlay the sensor and any inserted spacer to secure the sensor and the spacer within the external pocket. The spacer is selected to maintain substantially the same sensor standoff from the wellbore wall as the sensor spacing during gathering of the first set of data. In this way, the first set of data and the second set of data are normalized with respect to their positioning relative to the wellbore wall, regardless of the diameter of the wellbore wall at the location where data gathering occurs.

In any event, with the spacer inserted, the tool is deployed within the wellbore segment having the second diameter different than the first diameter. Again, the tool is preferably centralized along the central axis of the wellbore to ensure consistent standoff throughout all data gathering procedures. The tool is thus positioned so that the radially adjusted sensor carried in the tool outsert is adjacent the formation at a second standoff distance. Thereafter, the sensor may be utilized to acquire a second set of data utilizing the radially adjusted sensor. It will be appreciated that because of the desire to normalize data acquisition at two or more locations with varying wellbore diameters, the spacer is selected so that the first standoff distance in the wellbore segment having the first diameter is approximately the same as the second standoff distance in the wellbore segment having the second diameter. This is accomplished by utilizing the spacer to radially adjust the sensor outward or inward from the central axis of the wellbore. It will further be appreciated that centralizers may be utilized to position the tool to be coaxial with the central axis of the wellbore.

Thus, as described, spacers of varying thickness may be utilized to accommodate wellbores of varying diameter to ensure the standoff distance is substantially the same for each set of data acquired. The spacer and/or the clamp in the tool may be replaced for these different diameter wellbore segments to alter the radial adjustment of the sensor. Spacers of varying thicknesses may be provided and utilized as needed. As such, a spacer of a first thickness and positioned radially inward of a sensor may be replaced with another spacer having a second thickness different than the first thickness. Of course, depending on the diameter of the wellbore in any given location, the spacer thickness of a selected spacer may be greater than or less than the spacer thickness of the previous spacer. In any event, with the spacer inserted into the external pocket, an appropriately sized clamp may be secured to the tool body to secure the sensor and spacer within the external pocket. In some embodiments, rather than utilizing spacers of different thicknesses, clamps of different thicknesses may be utilized in conjunction with a biasing spacer that urges the sensor into contact with the clamp.

In some embodiments, the radially adjustable outsert 200 provides a more consistent media (i.e., consistent thickness) between the downhole sensors housed within the sensor module 215 and the formation 110 as compared to installing an intermediate layer of known material (e.g., transparent to gamma rays) over the downhole sensors to displace mud (or other fluid in the annulus) away from the downhole sensors; this is because the thickness of such an intermediate layer would wear down over time. In some embodiments, the radially adjustable outsert 200 reduces maintenance and repair time/costs as compared to the maintenance and repair time/costs that would be incurred by installing an intermediate layer of known material (e.g., transparent to gamma rays) over the downhole sensors to displace mud (or other fluid in the annulus) away from the downhole sensors; this is because the thickness of such an intermediate layer would wear down over time.

In some embodiments, because the sensor module 215 allows for the use of modular downhole sensors or downhole sensor arrays, the previously required logistics of shipping standalone sensors for use with a specific wellbore diameter are significantly simplified and the associated costs are reduced.

A downhole tool has been described. The downhole tool generally includes a tool body defining a longitudinal central axis and having an internal passage extending longitudinally through the tool body and an external pocket extending along the tool body; a sensor module having a sensor, the sensor module deployed within the external pocket; a spacer deployed in the external pocket, the spacer positioned between the sensor module and the tool body; and a clamp attached to the tool body, the clamp overlaying both the sensor module and the spacer to confine the sensor module within the external pocket. In other embodiments, the downhole tool may include a tool body defining a longitudinal central axis and having an internal passage extending longitudinally through the tool body and an elongated, external pocket extending longitudinally along the tool body; a sensor module having an elongated body and enclosing at least one sensor, the sensor module deployed within the external pocket; a crescent-shaped spacer deployed in the external pocket, the spacer positioned between the sensor module and the tool body, wherein the spacer is elongated and has an inner concave surface that engages the sensor module and an outer convex surface that seats in the external pocket; and a clamp attached to the tool body, the clamp overlaying over both the sensor module and the spacer to confine the sensor module within the external pocket. In still other embodiments, the downhole tool may include a tool body having an internal passage extending longitudinally through the tool body and an external pocket extending longitudinally along the tool body, a groove, and a first clamp attachment surface, the groove and the first clamp attachment surface extending on opposing sides of the external pocket; a clamp connected to the tool body, the clamp including a tongue and a second clamp attachment surface; and a sensor module having a sensor and being deployed within the external pocket; wherein the tongue extends within the groove to thereby secure the clamp to the tool body on one side of the external pocket without the use of fasteners.

All of the foregoing embodiments may include one or more of the following elements, either alone or in combination with one another:

The tool body further includes a groove extending longitudinally along one side of the external pocket and a first clamp attachment surface extending longitudinally along an opposite side of the external pocket; and wherein the clamp further includes a tongue and a second clamp attachment surface, wherein the tongue of the clamp seats in the groove of the tool body and the second clamp attachment surface of the clamp abuts the first clamp attachment surface of the tool body.

A plurality of fasteners securing the second clamp attachment surface of the clamp to the first clamp attachment surface of the tool body.

The external pocket is elongated and generally parallel with the longitudinal central axis, and wherein the clamp is elongated and generally parallel with the longitudinal central axis when attached to the tool body.

The spacer is crescent-shaped.

The spacer is elongated and has an inner concave surface that engages the sensor module and an outer convex surface that seats in the external pocket.

The pocket extends between a first end and a second end; and wherein the tool body further includes: an internal wireway extending through the tool body; and an adjustment slot adjacent one end of the pocket and interconnecting the internal wireway with the pocket.

The clamp overlaying the sensor module and the spacer radially protrudes from the tool body.

The tool body further includes a groove extending longitudinally along one side of the external pocket, a first clamp attachment surface extending longitudinally along an opposite side of the external pocket, and a plurality of spaced apart threaded holes formed in the first clamp attachment surface of the tool body; and wherein the clamp further includes a tongue and a second clamp attachment surface with a plurality of through holes formed through the second clamp attachment surface of the clamp, wherein the tongue of the clamp seats in the groove of the tool body and the second clamp attachment surface of the clamp abuts the first clamp attachment surface of the tool body; and a plurality of fasteners extend through the plurality of through holes and engage the plurality of threaded holes formed in the tool body so as to attach the clamp to the tool body along one side of the clamp.

The pocket extends between a first end and a second end; and wherein the tool body further includes: an internal wireway extending through the tool body; and an adjustment slot adjacent one end of the pocket and interconnecting the internal wireway with the pocket; the downhole tool further including an electrical connector deployed along the wireway; an electrical wire extending through the adjustment slot and electrically connecting the electrical connector with the sensor module; and a cover plate extending over the adjustment slot.

The clamp overlaying the sensor module and the spacer radially protrudes from the tool body.

A plurality of threaded holes are formed in the tool body at the first clamp attachment surface; a plurality of through holes are formed through the clamp at the second clamp attachment surface; and a plurality of fasteners extend through the plurality of through holes formed in the clamp at the second clamp attachment surface and threadably engage the plurality of threaded holes formed in the tool body at the first clamp attachment surface to thereby secure the clamp to the tool body on the other side of the external pocket.

A method of utilizing a downhole tool to make measurements in a wellbore formed in a formation and having different wellbore diameters has also been described. The method generally includes deploying a tool within a wellbore segment having a first diameter, the tool centralized along a central axis of the wellbore; positioning a sensor carried in an outset of the tool adjacent the formation at a first standoff distance; utilizing the sensor to acquire a first set of data; identifying a segment of the wellbore having a second diameter different than the first diameter; inserting a spacer in the tool to radially adjust the sensor; deploying the tool within the wellbore segment having the second diameter different than the first diameter, the tool centralized along the central axis of the wellbore; positioning the radially adjusted sensor carried in the tool outsert adjacent the formation at a second standoff distance; and utilizing the radially adjusted sensor to acquire a second set of data.

The foregoing method embodiment may include one or more of the following elements, either alone or in combination with one another:

The first standoff distance in the wellbore segment having the first diameter is approximately the same as the second standoff distance in the wellbore segment having the second diameter.

The spacer radially adjusts the sensor by displacing the sensor outward from the central axis of the wellbore.

Securing the sensor to the tool with a clamp that overlies both the sensor and the spacer.

Replacing the spacer in the tool to alter the radial adjustment of the sensor.

Inserting the spacer includes replacing a spacer of a first thickness and positioned radially inward of the sensor with another spacer having a second thickness different than the first thickness.

The spacer is selected to have a second thickness less than the first thickness.

Inserting the spacer includes replacing a first clamp overlaying the sensor with a second radially protruding clamp overlaying the sensor and the insert.

It is understood that variations may be made in the foregoing without departing from the scope of the present disclosure.

In some embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In some embodiments, while different steps, processes, and procedures are described as appearing as distinct acts, one or more of the steps, one or more of the processes, and/or one or more of the procedures may also be performed in different orders, simultaneously and/or sequentially. In some embodiments, the steps, processes, and/or procedures may be merged into one or more steps, processes and/or procedures.

In some embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although some embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims.

What is claimed is:

1. A downhole tool, comprising:
   a tool body defining a longitudinal central axis and having an internal passage extending longitudinally through the tool body and an external pocket extending along the tool body;
   a sensor module having a sensor, the sensor module deployed within the external pocket;
   a spacer deployed in the external pocket, the spacer positioned between the sensor module and the tool body to radially adjust the sensor module by displacing the sensor module outward from the longitudinal central axis of the tool body, the spacer being elongated and extending longitudinally across a length of the external pocket and having an inner concave surface that engages the sensor module and an outer convex surface that seats in the external pocket; and
   a clamp attached to the tool body, the clamp overlaying both the sensor module and the spacer to confine the sensor module within the external pocket.

2. The downhole tool of claim 1, wherein the tool body further comprises a groove extending longitudinally along one side of the external pocket and a first clamp attachment surface extending longitudinally along an opposite side of the external pocket; and wherein the clamp further comprises a tongue and a second clamp attachment surface, wherein the tongue of the clamp seats in the groove of the tool body and the second clamp attachment surface of the clamp abuts the first clamp attachment surface of the tool body.

3. The downhole tool of claim 2, further comprising a plurality of fasteners securing the second clamp attachment surface of the clamp to the first clamp attachment surface of the tool body.

4. The downhole tool of claim 1, wherein the external pocket is elongated and generally parallel with the longitudinal central axis.

5. The downhole tool of claim 1, wherein the spacer is crescent-shaped.

6. The downhole tool of claim 1, wherein the external pocket extends between a first end and a second end, and wherein the tool body further comprises:
   an internal wireway extending through the tool body; and
   an adjustment slot adjacent one end of the external pocket and interconnecting the internal wireway with the external pocket.

7. The downhole tool of claim 1, wherein the clamp overlaying the sensor module and the spacer radially protrudes from the tool body.

8. A downhole tool, comprising:
   a tool body defined along a longitudinal central axis and having an internal passage extending longitudinally through the tool body and an elongated external pocket extending longitudinally along the tool body;
   a sensor module having an elongated body and enclosing at least one sensor, the sensor module deployed within the external pocket;
   a crescent-shaped spacer deployed in the external pocket, the spacer positioned between the sensor module and the tool body to radially adjust the sensor module by displacing the sensor module outward from the longitudinal central axis of the tool body, wherein the spacer is elongated and extends longitudinally across a length of the external pocket and has an inner concave surface that engages the sensor module and an outer convex surface that seats in the external pocket; and
   a clamp attached to the tool body, the clamp overlaying both the sensor module and the spacer to confine the sensor module within the external pocket.

9. The downhole tool of claim 8,
   wherein the tool body further comprises:
      a groove extending longitudinally along one side of the external pocket, a first clamp attachment surface extending longitudinally along an opposite side of the external pocket, and
      a plurality of spaced apart threaded holes formed in the first clamp attachment surface of the tool body; and
   wherein the clamp further comprises a tongue and a second clamp attachment surface with a plurality of through holes formed through the second clamp attachment surface of the clamp, and
   wherein the tongue of the clamp seats in the groove of the tool body and the second clamp attachment surface of the clamp abuts the first clamp attachment surface of the tool body; and a plurality of fasteners extend through the plurality of through holes and engage the plurality of threaded holes formed in the tool body so as to attach the clamp to the tool body along one side of the clamp.

10. The downhole tool of claim 8,
    wherein the external pocket extends between a first end and a second end, and
       wherein the tool body further comprises:
          an internal wireway extending through the tool body, and
          an adjustment slot adjacent one end of the external pocket and
             interconnecting the internal wireway with the external pocket;
    the downhole tool further comprising:
       an electrical connector deployed along the wireway; and
       an electrical wire extending through the adjustment slot and electrically connecting the electrical connector with the sensor module; and a cover plate extending over the adjustment slot.

11. The downhole tool of claim 8, wherein the clamp overlaying the sensor module and the spacer radially protrudes from the tool body.

* * * * *